United States Patent [19]
Kennedy

[11] 3,949,339
[45] Apr. 6, 1976

[54] ANGULAR POSITION TRANSDUCER

[75] Inventor: Charles J. Kennedy, Pasadena, Calif.

[73] Assignee: C. J. Kennedy Company, Altadena, Calif.

[22] Filed: Nov. 18, 1974

[21] Appl. No.: 524,635

[52] U.S. Cl. .............................................. 336/135
[51] Int. Cl.² ........................................ H01F 21/06
[58] Field of Search ............ 336/130, 132, 134, 135, 336/120, 83; 323/51, 52

[56] References Cited
UNITED STATES PATENTS

| | | | |
|---|---|---|---|
| 2,628,342 | 2/1953 | Taylor | 336/135 X |
| 2,873,431 | 2/1959 | Marsh | 336/135 |
| 2,997,584 | 8/1961 | Querfurth | 336/135 X |
| 3,146,418 | 8/1964 | Maeda | 336/134 |
| 3,155,931 | 11/1964 | Maeda | 336/135 X |
| 3,204,149 | 8/1965 | Vance | 336/135 |
| 3,217,277 | 11/1965 | Gee et al. | 336/135 |
| 3,492,618 | 1/1970 | Linke | 336/120 |
| 3,550,053 | 5/1969 | Carlo | 336/135 X |

FOREIGN PATENTS OR APPLICATIONS

| | | | |
|---|---|---|---|
| 1,022,035 | 2/1953 | France | 336/120 |
| 1,523,460 | 5/1968 | France | 336/83 |

*Primary Examiner*—Thomas J. Kozma
*Attorney, Agent, or Firm*—Fraser and Bogucki

[57] ABSTRACT

An angular position transducer includes a core of magnetic material of circular shape and having a central hub extending from a central portion of and opposite outer rims extending from the outer periphery of a disk-shaped web. An armature which is of like size and shape to one half of the core so as to be semicircular in configuration is mounted so as to undergo rotation relative to the core, the single outer rim of the armature being disposed adjacent one or the other or both of the outer rims of the core. A primary winding wrapped around the central hub of the core produces magnetic flux which flows into the armature, then through the single outer rim of the armature and adjacent portions of the outer rims of the core to a pair of secondary windings wound around the web of the core on opposite sides of the hub. The voltages induced in the two different secondary windings provide an indication of the angular position of the armature relative to the core, the algebraic sum of the voltages varying in generally linear fashion with changing angular positions of the armature relative to the core.

7 Claims, 5 Drawing Figures

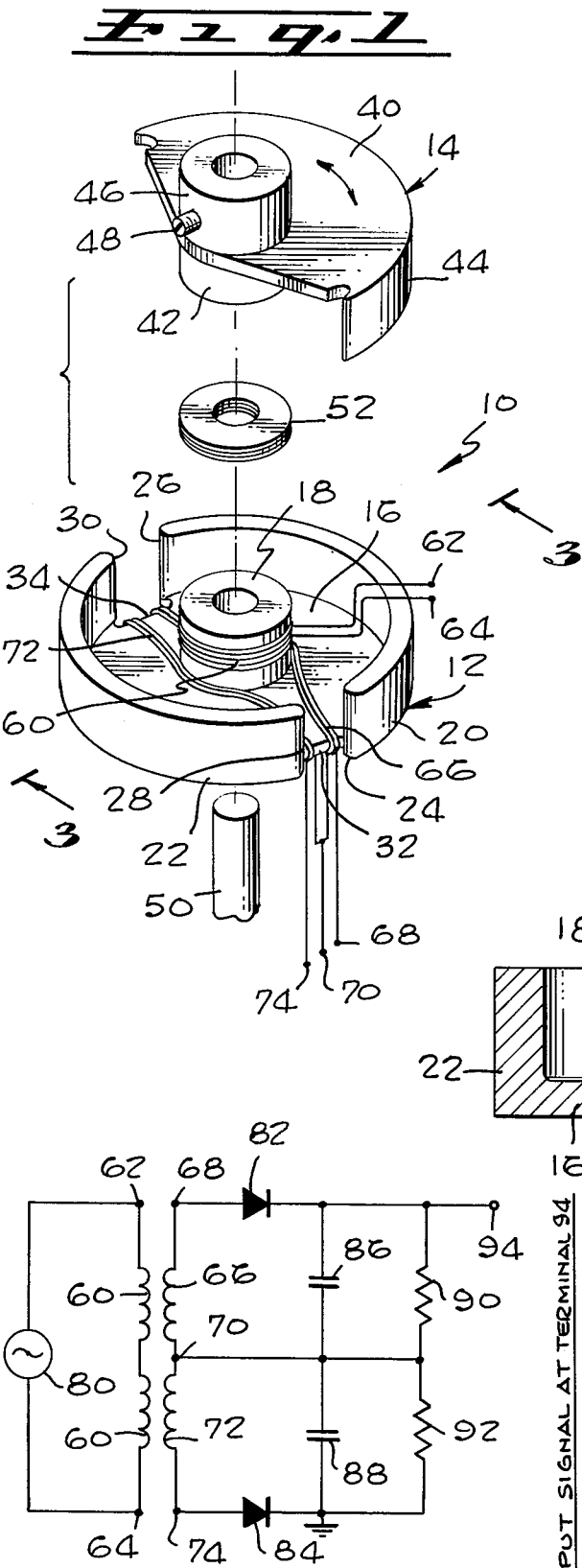
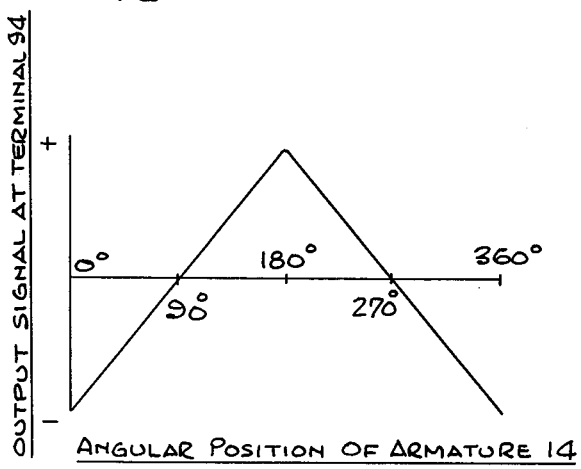

ANGULAR POSITION TRANSDUCER

BACKGROUND OF THE INVENTION

1. Field of the Invention

The present invention relates to angular position transducers of the type which provide an electrical signal which varies with angular position of a rotatable mechanical element to provide an indication of the angular position of the element.

2. History of the Prior Art

Angular position transducers are commonly used in various different applications where it is desired to provide a varying electrical signal to indicate the angular position of a mechanical element. Such transducers are useful, for example, in magnetic tape decks where they are employed to provide a constant indication of the angular position of pivotably mounted tension arms which engage the magnetic tape.

Angular position transducers of the electrical type commonly employ a primary winding or other means to induce magnetic flux in a rotatable mechanical element, from which the flux is sensed by one or more secondary windings. The amount of flux sensed by the one or more secondary windings provides an indication of an angular position of the rotatable mechanical element.

Prior art angular position transducers suffer from a number of disadvantages which may make them unsuitable for many applications of such devices. In one type of prior art arrangement in which the rotatable mechanical element is pivotably mounted so as to be movable relative to the opposite legs of an E-shaped core so as to vary the relative amounts of flux from a primary winding on the center leg of the core which flow into a pair of secondary windings on the opposite legs of the core, the resulting output signal typically varies with respect to the angular position of the rotatable mechanical element in relatively nonlinear fashion, due among other things to the nonlinear variation of the flux density with variation in the size of the air gaps. Still other transducers which rotate the rotatable mechanical element relative to a core in such a way as to vary the area of one or more air gaps while maintaining the depth of the air gap constant provide performance which is more linear in nature, but at the expense of considerable cost and complexity in the construction of the transducer. Still other arrangements in the prior art provide varying degrees of linearity in the performance thereof at the expense of other factors in the design or operation of the transducer.

Accordingly it would be desirable to provide an angular position transducer which is of relatively simple and inexpensive construction and yet which provides substantially linear performance over a wide range of possible angular positions.

BRIEF SUMMARY OF THE INVENTION

Angular position transducers in accordance with the invention are comprised of opposite, mating core and armature elements, the core element being of circular configuration and the armature element being of identical size and shape except that approximately half of the peripheral portion is absent so that the armature element is generally semi-circular in configuration. A primary winding wound about a central hub within the core element causes magnetic flux to flow into the central core of the armature element, from which the flux flows through an outer rim of the armature element and through one or the other or both of a pair of opposite outer rims of the core element via an air gap which varies in area but not in depth relative to the outer rims of the core element as the armature element is rotated relative to the core element. A pair of secondary winding wound around the core element so as to extend between the adjacent opposite ends of the outer rims and around opposite sides of the central hub provide a measure of the differential changes in the fluxes flowing to the outer rims of the core element as the armature element is rotated relative to the core element. The differential changes vary in substantially linear fashion for practically all angular positions of the armature element relative to the core element.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 1 is a perspective, exploded view of an angular position transducer in accordance with the invention;

FIG. 2 is a perspective view of the armature of the transducer of FIG. 1;

FIG. 3 is a section view of the transducer of FIG. 1 taken along the line 3—3 of FIG. 1;

FIG. 4 is a schematic diagram of the electrical connections of the transducer of FIG. 1; and FIG. 5 is a diagrammatic plot of the output signal as a function of angular position for the transducer of FIG. 1.

DETAILED DESCRIPTION

As shown in FIG. 1 an angular position transducer 10 in accordance with the invention includes a core 12 and an armature 14. The core 12 is of generally circular configuration and is comprised of a generally disk-shaped web 16, a hollow, generally cylindrical hub 18 joining the web 16 at the center and extending from one side of the web 16, and a pair of outer rims 20 and 22 joined to the outer periphery of the web 16 so as to extend from the same side of the web 16 as the hub 18 and in the same direction. The hub 18, the rim 20 and the rim 22 extend approximately equal distances from the web 16.

The rim 20 has first and second ends 24 and 26 respectively while the rim 22 has first and second ends 28 and 30 respectively. The first ends 24 and 28 are adjacent and yet spaced-apart from one another in the region of a recess 32 in the web 16. Similarly, the second ends 26 and 30 are disposed in adjacent, spaced-apart relation at a recess 34 in the web 16.

The armature 14 which is inverted from the position of FIG. 1 in the view of FIG. 2 is comprised of a web 40 in the form of approximately half of a disk, a central hub 42 of hollow, generally cylindrical configuration extending from a surface of the web 40 in a given direction, and a single outer rim 44 extending from the periphery of the web 40 in the same direction and by the same distance as the hub 42. The armature 14 is equal in size, shape and construction to approximately one-half of the core 12. Whereas the web 16 of the core 12 is in the shape of a complete disk, the web 40 of the armature 14 comprises slightly more than half of a disk. Whereas the core 12 has two different outer rims 20 and 22, the armature 14 has a single outer rim 44 identical in size and shape to either of the outer rims 20 and 22. The armature 14 has the complete cylindrical hub 42 to facilitate rotational motion relative to the core 12 as described hereafter. In addition the armature 14 has a hollow cylinder 46 joined thereto on the opposite side of the web 40 from the hub 42. The cylinder 46 has a threaded screw 48 disposed in the side wall thereof to engage and secure a shaft 50 within the cylinder 46 as described in connection with FIG. 3. A plurality of non-metallic washers 52 of cross sectional size similar to the hubs 18 and 42 are disposed between the hubs 18 and 42 to provide an air gap of desired size between the core 12 and the armature 14.

The core 12 may be made as an integral unit and is comprised of an appropriate magnetic material such as Ferrite. The armature 14 is of similar material and construction. Where desired the armature 14 may be made in the complete circular configuration as in the case of the core 12, following which one of the outer rims is removed together with selected portions of the web 40 to provide the armature 14 with the desired configuration. Thereafter the cylinder 46 is secured to the armature 14 to form the completed armature.

A pair of serially coupled windings are disposed around the central hub 18 of the core 12 to form a primary winding 60 having a pair of terminals 62 and 64. A first secondary winding 66 is wound around the web 16 of the core 12 so as to extend between the first ends 24 and 28 of the rims 20 and 22 at the recess 32 and so as to extend between the second ends 26 and 30 of the rims 20 and 22 at the recess 34. The secondary winding 66 is disposed on the side of the central hub 18 adjacent the outer rim 20 and has one lead coupled to a terminal 68 and the other lead thereof coupled to a common terminal 70. A second secondary winding 72 is wound around the web 16 of the core 12 so as to be disposed on the opposite side of the central hub 18 from the secondary winding 66 and adjacent the outer rim 22. Like the first secondary winding 66 the second secondary winding 72 extends between the first ends 24 and 28 of the rims 20 and 22 at the recess 32 and between the second ends 26 and 30 of the outer rims 20 and 22 at the recess 34. The second secondary winding 72 has one lead thereof coupled to the common terminal 70 and the other lead thereof coupled to a terminal 74.

FIG. 3 is a sectional view of the transducer 10 of FIG. 1 as assembled. The screw 48 is tightened within the cylinder 46 to secure the upper end of the shaft 50 within the cylinder 46. Since the cylinder 46 is rigidly joined to the armature 14, the armature 14 is thereby securely joined to the upper end of the shaft 50. On the other hand the shaft 50 is freely journaled within the central hub 18 of the core 12 such that the shaft 50 and the armature 14 secured thereto are rotatable relative to the core 12. The washers 52 which are made of Teflon or other appropriate material are disposed between the central hubs 18 and 42 to provide an air gap 78 of desired size between the outer rim 44 of the armature 14 and the rims 20 and 22 of the core 12.

With the primary winding 60 coupled to an alternating current source 80 as shown in FIG. 4 magnetic flux is induced in the central hub 18 of the core 12. The magnetic flux flows through the washers 52 and into the central hub 42 of the armature 14 from which it flows through the web 40 to the outer rim 44 of the armature 14. The flux flows from the outer rim 44 of the armature 14 through the air gap 78 and into one or the other or both of the outer rims 20 and 22 of the core 12, from which it flows into the web 16 to the secondary windings 66 and 72. The flux divides itself between the secondary windings 66 and 72 in direct relation to the angular position of the armature 14 relative to the core 12. The upper edges of the rims 20 and 22 of the core 12 define a generally circular path within a plane. The rim 44 of the armature 14 rotates through a second circular path within a second plane parallel to and spaced apart from the plane of the rims 20 and 22 by the size of the air gap 78. With the armature 14 positioned relative to the core 12 as shown in FIG. 1, substantially all of the flux in the rim 44 flows into the rim 20 to provide a large voltage in the secondary winding 66 and virtually no voltage in the secondary winding 72. Conversely with the armature 14 turned 180° from the position shown in FIG. 1 so as to be disposed over the rim 22, substantially all of the magnetic flux from the rim 44 flows into the rim 22 with a substantial voltage being induced in the secondary winding 72 and virtually no voltage being induced in the secondary winding 66. For most possible angular positions of the armature 14, the magnetic flux from the rim 44 flows into both the rim 20 and the rim 22 in direct proportion to the angular position of the armature 14 with respect to the core 12.

As seen in FIG. 4 the alternating current source 80 is coupled to the opposite terminals 62 and 64 of the primary winding 60 to provide magnetic flux of alternating sense. The source 80 may be of appropriate high frequency such as 200 kilocycles. As the armature 14 is rotated relative to the core 12 the amount of voltage induced by the flux varies between the two different secondary windings 66 and 72. The voltages induced in the secondary windings 66 and 72 are rectified and algebraically summed by an arrangement which includes a pair of diodes 82 and 84, a pair of capacitors 86 and 88 and a pair of resistors 90 and 92. The diode 82 is coupled to the terminal 68 of the first secondary winding 66, and the capacitor 86 and resistor 90 are coupled in parallel between the opposite side of the diode 82 and the common terminal 70. The diode 84 is coupled to the terminal 74 of the second secondary winding 72, and the capacitor 88 and resistor 92 are coupled in parallel between ground at the opposite side of the diode 84 and the common terminal 70. The side of the diode 82 opposite the terminal 68 is coupled to an output terminal 94 which provides the output signal for the transducer 10.

The manner in which the output signal varies with angular position of the armature 14 in linear fashion is shown in FIG. 5 which is a plot of the output signal as a function of the angular position. It will be seen that as the armature 14 rotates from a starting position denoted as 0° to a position 180° removed therefrom, the output signal varies linearly from its minimum value to its maximum value. As the armature 14 continues to rotate from the 180° position through the 270° position and back to the original position, the output signal decreases linearly from its maximum value back to its minimum value.

In one model of the transducer 10 actually constructed and successfully tested in accordance with the invention the core 12 is integrally constructed of Ferrite so as to have an outer diameter of seven-eighths inch and a thickness of one-fourth inch. The outer diameter of the central hub 18 is three-eighths inch, the thickness of the rims 20 and 22 is one-sixteenth inch and the thickness of the web 16 is slightly less than one-sixteenth inch. Corresponding parts of the armature 14 have the same dimensions. The cylinder 46 has an outer diameter of three-eighths inch and is three-sixteenths inch long. A selected number of the Teflon washers 52 are used so as to provide an air gap 78 of approximately 0.015 inch. The primary winding 60 comprises approximately 50 turns of No. 34 wire on a plastic bobbin disposed around the central hub 18. Each of the secondary windings 66 and 72 comprises approximately 30 turns of No. 36 wire. With the windings 60, 66 and 72 in place an epoxy potting compound is introduced in the spaces between the first ends 24 and 28 and the second ends 26 and 30 to fill and seal the inside of the core 12 and thereby provide a completed, integral structure.

Tests of the device just described using the electrical circuit of FIG. 4 have shown the output signal to be virtually liner as shown in FIG. 5.

While the invention has been particularly shown and described with reference to a preferred embodiment thereof, it will be understood by those skilled in the art that various changes in form and details may be made therein without departing from the spirit and scope of the invention.

What is claimed is:

1. An angular position transducer comprising the combination of:
    a core element having a central hub portion, a pair of generally circular outer rim portions disposed on opposite sides of and spaced apart from the central hub portion and means coupling the outer rim portions to the hub portion;
    an armature element having a central hub portion disposed adjacent the central hub portion of the core element, a generally circular outer rim portion spaced apart from the central hub portion on only one side of the central hub portion and means coupling the outer rim portion to the hub portion, the armature element being rotatable relative to the core element about an axis of rotation extending through the central hub portion to vary the position of the outer rim portion relative to the outer rim portions of the core element;
    means at least partially surrounding the hub portion of the core element for providing magnetic flux therein, the magnetic flux flowing through the central hub portion of the armature element and the means coupling of the armature element and into the outer rim portion of the armature element;
    first means for sensing magnetic flux, said first means being coupled to the core element adjacent one of the pair of outer rim portions of the core element; and
    second means for sensing magnetic flux, said second means being coupled to the core element adjacent the other one of the pair of outer rim portions of the core element.

2. The invention defined in claim 1, wherein the means coupling of the core element comprises a web portion extending between the central hub portion and the outer rim portions, the first means for sensing comprises first winding means wound around the web portion between the central hub portion and one of the outer rim portions of the core element, and the second means for sensing comprises second winding means wound around the web portion between the central hub portion and the other one of the outer rim portions of the core element.

3. The invention defined in claim 2, wherein the means for providing magnetic flux in the central hub portion of the core element comprises third winding means wound around the central hub portion of the core element.

4. An angular position transducer comprising the combination of:
    a core of generally circular configuration having a disk-shaped web, a central hub of cylindrical configuration joined to one side of the web at the center of the web, a first outer rim in the shape of a portion of a ring and joined to said one side of the web at the outer edge of the web, a second outer rim substantially identical to the first outer rim and joined to said one side of the web at the outer edge of the web on the opposite side of the central hub from the first outer rim so as to be spaced apart from the first outer rim, the first and second rims extending from said one side of the web approximately the same distance as the central hub extends from said one side of the web;
    an armature being of the same size and shape as approximately one-half of the core so as to be of generally semi-circular configuration, said armature being disposed so as to be rotatable relative to the core;
    means at least partially surrounding the central hub of the core for providing a flow of magnetic flux from the core to the armature;
    first flux sensing means coupled to the core to sense the amount of magnetic flux flowing into the first outer rim of the core from the armature; and
    second flux sensing means coupled to the core to sense the amount of magnetic flux flowing into the second outer rim of the core from the armature.

5. The invention defined in claim 4, wherein the first and second flux sensing means comprise first and second windings wound around a portion of the web between the first and second outer rims and disposed on opposite sides of the central hub of the core.

6. The invention defined in claim 5, wherein the means for providing a flow of magnetic flux from the core to the armature comprises a winding wound around the central hub of the core.

7. An angular position transducer comprising the combination of:
    a core of magnetic material having a generally disk-shaped web, a central hub joined to the web at the center of the web, a first outer rim of semi-circular configuration joined to the web at a first peripheral portion of the web and having opposite first and second ends, and a second outer rim of semi-circular configuration joined to the web at a second peripheral portion of the web on the opposite side of the central hub from the first peripheral portion of the web and having opposite first and second ends disposed adjacent and spaced-apart from the first and second ends respectively of the first outer rim, the first and second outer rims forming a generally circular path;
    a primary winding wound around the central hub of the core;
    a first secondary winding wound around the web of the core, the first secondary winding being disposed between the first ends of the first and second outer rims and between the second ends of the first and second outer rims and extending between the central hub and the first outer rim;

a second secondary winding wound around the web of the core, the second secondary winding being disposed between the first ends of the first and second outer rims and between the second ends of the first and second outer rims and extending between the central hub and the second outer rim; and an armature of magnetic material having a web in the shape of a portion of a disk, a central hub joined to a portion of the web and an outer rim of shape similar to the first and second outer rims of the core joined to the web at a peripheral portion thereof, the armature having the central hub thereof disposed adjacent the central hub of the core and being rotatable about an axis extending through the central hub of the armature and the central hub of the core to rotate the outer rim through a generally circular path adjacent and spaced-apart from the circular path of the first and second outer rims of the core.

* * * * *